Figure 1:
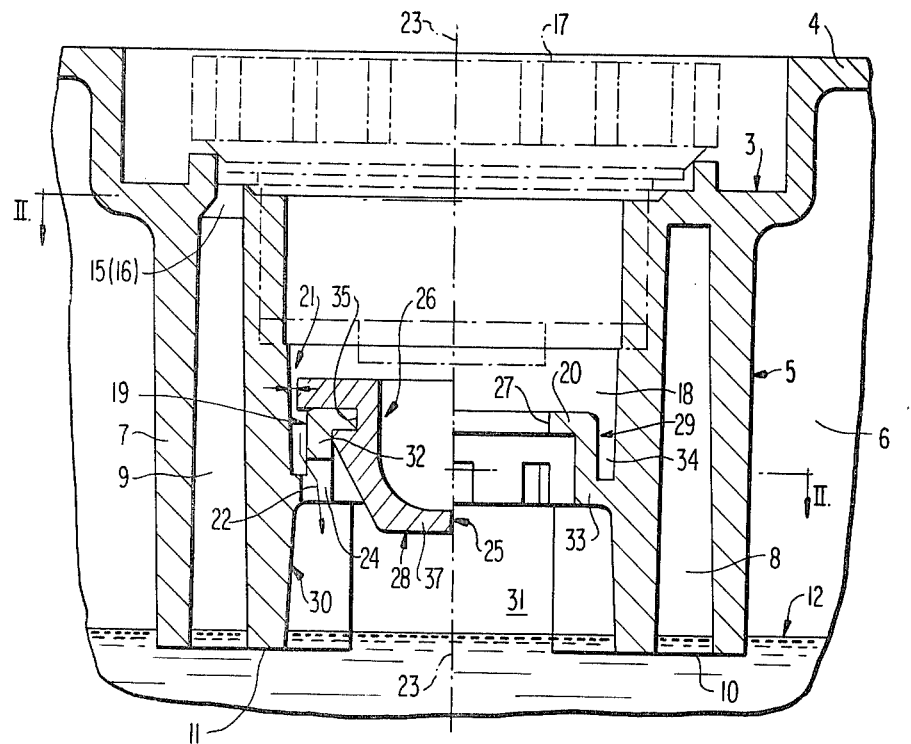

United States Patent [19]

Köhler et al.

[11] 4,211,831

[45] Jul. 8, 1980

[54] BATTERY VENT AND FILLER OPENING STRUCTURE

[75] Inventors: Werner Köhler, Stuttgart; Gerhard Drücker, Neuhausen; Ulrich Kiess, Esslingen; Manfred Stotz, Aichwald, all of Fed. Rep. of Germany

[73] Assignee: Daimler-Benz Aktiengesellschaft, Fed. Rep. of Germany

[21] Appl. No.: 879,748

[22] Filed: Feb. 21, 1978

[30] Foreign Application Priority Data

Feb. 26, 1977 [DE] Fed. Rep. of Germany ........ 2708531

[51] Int. Cl.² .......................................... H01M 2/36
[52] U.S. Cl. ...................................... 429/78; 429/82
[58] Field of Search ................ 429/78, 72, 63, 54, 429/89, 82

[56] References Cited

U.S. PATENT DOCUMENTS

| 2,346,937 | 4/1944 | Olson | 429/78 |
|---|---|---|---|
| 2,516,084 | 7/1950 | Wells | 429/72 |
| 2,930,831 | 3/1960 | Hemig | 429/63 |

FOREIGN PATENT DOCUMENTS

| 245021 | 5/1963 | Australia | 429/63 |
|---|---|---|---|
| 377471 | 12/1939 | Italy | 429/63 |

Primary Examiner—Donald L. Walton
Attorney, Agent, or Firm—Craig & Antonelli

[57] ABSTRACT

A battery with at least one cell containing an electrolyte liquid, in which the cell is adapted to be connected with the atmosphere by way of a fill-in venting connection determining its liquid level and by way of a separate fill-in connection for the filling in of electrolyte liquid and for the refilling of distilled water as well as by way of a control opening for the insertion of a testing device for checking the operating condition, and in which the free flow cross section of the fill-in connection is dimensioned so narrowly that a liquid seal closing off the fill-in connection gas-tight will form under the influence of the capillary action and of the excess pressure which will be established during the fill-in operation into the cell, when the liquid enters the opening of the fill-in venting connection which terminates in the cell; a control opening which can be restoringly enlarged in its cross section is disposed in an elastic wall and is separate from the fill-in connection and essentially closed as such when the testing instrument is removed.

25 Claims, 2 Drawing Figures

U.S. Patent

Jul. 8, 1980

4,211,831

BATTERY VENT AND FILLER OPENING STRUCTURE

The present invention relates to a battery with at least one cell containing an electrolyte, in which the cell is adapted to be connected with the atmosphere by way of a fill-in venting connection determining its liquid level and by way of a separate fill-in connection for the filling-in of electrolyte liquid and for the refilling of distilled water as well as by way of a control opening for the insertion of a testing instrument for monitoring the operating condition.

The task underlying the present invention essentially consists in assuring the capillary functioning of the fill-in connection also when distilled water is refilled in the form of a strong, relatively thin water jet out of a commercial spray bottle. With a battery wherein distilled water was added to the cell through the control opening, the danger existed that a capillary effect could not establish itself in the control opening—which by reason of its additional fill-in function would have to have a relatively wide free outlet cross section—by reason of the high kinetic energy of the water jet so that the maximum permissive liquid level in the cell was frequently unconsciously exceeded during the refilling operation.

The underlying problems are solved according to the present invention in that the control opening is separate from the fill-in connection and is essentially closed, as such, with a removed testing instrument.

With the battery according to the present invention, the control opening is closed during the filling-in and the refilling of liquid so that the overfilling protection, is reliably assured under all conditions.

In order to be able to utilize a softer and more elastic material for the wall provided with the control opening than for the outer wall of the battery, it is advantageous with the battery according to the present invention that a diaphragm provided with the control opening is held in an opening terminating in the cell.

In order to avoid with the use of a diaphragm for the control opening a snap effect during the removal of the testing apparatus, which would cause a splashing-up of liquid, it is additionally favorable with the battery according to the present invention that the control opening is arranged in the bottom of the pot-shaped diaphragm facing the cell.

With a battery of the type having at least one cell containing an electrolyte liquid in which the cell is adapted to be connected with the atmosphere by way of a fill-in venting connection determining its liquid level and is adapted to be connected by way of a separate fill-in connection for the filling-in of electrolyte liquid and for the refilling of distilled water and in which the free cross section of the fill-in connection is dimensioned so narrowly that a liquid seal closing off the fill-in connection in a gas-tight manner forms under the influence of the capillary effect and of the excess pressure which will establish itself during the fill-in operation into the cell, when the liquid has entered the opening of the fill-in venting connection terminating in the cell, the capillary functioning of the fill-in connection for achieving a protection against an unintentional excessive filling also during refilling by means of a spray bottle producing a relatively thin but strong jet, is assured in an advantageous manner in that one or several baffle structures for dissipating kinetic energy of the liquid to be filled-in are connected upstream of the opening of the fill-in connection terminating in the cell, as viewed in the direction toward the atmosphere.

Such baffle structures may be created, for example, by throttle cross sections or flow deflections connected upstream thereof.

With a battery of the type having at least one cell containing an electrolyte liquid, which is provided with a fill-in venting connection determining its liquid level, whose opening for the production of a capillary effect, which terminates in the atmosphere, is constricted, an unintended entry of liquid into the venting connection is prevented by the capillary constriction also when the orifices of the fill-in and venting connection on the side of atmosphere are located closely adjacent one another. Since, however, a narrow slot is poorly determinable in its capillary action, it is advantageous with the battery according to the present invention that the constricted opening is formed by one or several small bores.

A good protective action of the capillary constriction results if the bore has a diameter of about 2 mm.

Accordingly, it is an object of the present invention to provide a battery of the type described above which avoids by simple means the aforementioned shortcomings and drawbacks encountered in the prior art.

Another object of the present invention resides in a battery, in which the capillary functioning of the fill-in connection is also assured when distilled water in the form of a strong, relatively thin water jet from a commercial spray bottle is used for refilling.

A further object of the present invention resides in a battery which assures a completely reliable protection against excessive filling of the battery.

A still further object of the present invention resides in a battery achieving the aforementioned aims and objects, in which a softer and more elastic material can be utilized for the control opening than is used for the outer wall of the battery.

Still another object of the present invention resides in a battery in which a snap effect by the control opening which might splash up liquid when removing the testing device is effectively avoided.

Still another object of the present invention resides in a battery in which the capillary constriction prevents an unintentional entry of liquid into the venting connection also when the orifices of the fill-in and vent connections on the side of the atmosphere are closely adjacent one another.

Figure 2:
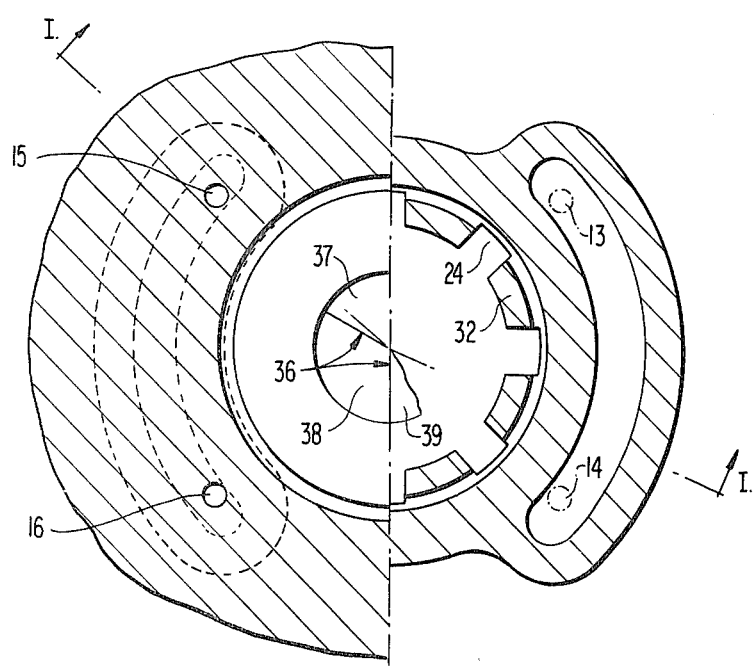

These and other objects, features and advantages of the present invention will become more apparent from the following description when taken in connection with the accompanying drawing which shows, for purposes of illustration only, one embodiment in accordance with the present invention, and wherein:

FIG. 1 is a vertical partial cross-sectional view taken along line I—I of FIG. 2 within the area of the open fill-in connection of a cell of a motor vehicle battery in accordance with the present invention; and FIG. 2 is a partial cross-sectional view through the fill-in connection of the battery taken along line II—II of FIG. 1.

Referring now to the drawing wherein like reference numerals are used throughout the two views to designate like parts, an essentially cylindrical fill-in connection generally designated by reference numeral 5 extends downwardly from a recess generally designated by reference numeral 3 of the top wall 4 of the battery; the fill-in connection 5 is located in the interior space of a cell 6 for electrolyte liquid. Two vertical fill-in venting channels 8 and 9 extend within the wall 7 of the fill-in connection 5, whose lower orifices 10 and 11 disposed in the interior space of the cell 6 determine the highest permissive liquid level 12 in the cell 6. The two fill-in venting channels 8 and 9 each terminate at the upper end thereof in two vent bores 13 and 14, respectively, 15 and 16 (FIG. 2) which with an unscrewed or removed fill-in closure means (indicated in FIG. 1 in dash and dotted lines at 17) terminate in the atmosphere. The bores 13 and 14, respectively, 15, 16 which form a capillary constriction for the channels 8 and 9, have a diameter of about 2 mm. and are adapted to be closed off with respect to the atmosphere by the fill-in closure plug 17.

A concentric fill-in chamber 18 of the fill-in connection 5, which is also adapted to be closed off with respect to the atmosphere by the fill-in closure member 17, can be brought into communication with the interior space of the cell 6 along two paths. The first path consists of the continuously open fill-in connection generally designated by reference numeral 19 having several slot openings 24 (FIGS. 1 and 2) extending in the circumferential direction with respect to the axis 23—23 of the fill-in connection 5, which slot openings 24 are constructed as recesses in an annular flange of Z-shaped cross section generally designated by reference numeral 29 which extends radially inwardly from the inner surface 30 of the wall 7 into the central opening 31 of the fill-in connection 5. In order to create a flow deflection indicated by the arrow 22 (FIG. 1) in the fill-in connection 19, the recesses forming the slot openings 24 extend by way of mutually adjoining partial areas of the web 32 and of the radial leg 33 of the annular flange 29 connecting the web 32 with the wall 7. Whereas the flow in the annular gap 34 enclosed between the wall 7 and the web 32 is directed parallel to the axis 23—23, the remaining section of the leg 33 forcibly brings about a deflection of the flow in the direction toward the axis 23—23. The annular gap 34 forms a throttle cross section in the fill-in connection 19 connected upstream of the slot opening 24. A pot-shaped elastic diaphragm generally designated by reference numeral 26 is retained in an opening 27 enclosed by the other radial leg 20 of the annular flange 29—which for the creation of the second path for the connection of the fill-in chamber 18 with the interior space of the cell 6 is located in the by-pass to the fill-in connection 19—in that the leg 20 is pressed into an outer circumferential groove 35 of the diaphragm 26. A star-shaped slot 36 (FIG. 2) is provided in the bottom 28 of the diaphragm 26, by means of which the control opening 25 is obtained. The three tongues 37, 38 and 39 formed by the slot 36 keep the control opening 25 closed, as such, which forms a passage from the fill-in chamber 18 to the cell 16 only when the tongues 37 to 39 are spread apart from one another downwardly by the testing instrument during the insertion of the latter.

It is assured by the arrangement of the bottom 28 recessed with respect to the fill-in chamber 18 and by the pot-shaped construction of the diaphragm 26 that during the removal of the testing device out of the control opening 25, the tongues 37 to 39 cannot snap beyond their normal closing position in the direction toward the fill-in chamber 18.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A battery, comprising at least one cell means containing an electrolyte liquid, in which the cell means is connected with the atmosphere by way of a fill-in vent connection determining its liquid level and by way of a separate fill-in connection means for filling in electrolyte liquid and for refilling distilled water as well as by way of a control opening means for the insertion of a testing device for checking the operating condition, and in which the free flow cross section of the separate fill-in connection means is dimensioned so narrowly that a liquid seal closing off the fill-in connection means gas-tight will form under the influence of the capillary action and of the excess pressure which will be established during the filling operation of the cell means when the liquid has entered into the opening of the fill-in vent connection terminating in the cell means, and in which a control opening means disposed in an elastic wall is operable to be enlarged, characterized in that the control opening means is separate from the fill-in connection means and is adapted to be essentially closed when the testing device is not inserted therein.

2. A battery according to claim 1, characterized in that the control opening means is operable to be enlarged in a self-restoring manner.

3. A battery according to claim 2, characterized by a diaphragm means provided with the control opening means which is held in an opening terminating in the cell means.

4. A battery according to claim 3, characterized in that the diaphragm means is pot-shaped and positioned facing the cell means, and the control opening means is arranged in the bottom of the pot-shaped diaphragm means facing the cell means.

5. A battery according to claim 4, characterized in that at least one baffle means for dissipating kinetic energy of the liquid to be filled-in is connected in series with and upstream of the opening of the fill-in connection means terminating in the cell means in the direction toward the atmosphere.

6. A battery according to claim 5, characterized by at least one series-connected throttle cross section means connected upstream of said opening of the fill-in connection means terminating in the cell means.

7. A battery according to claim 6, characterized by at least one flow deflection means in said fill-in connection means.

8. A battery according to claim 5, wherein said fill-in vent connection determining its liquid level has an opening terminating in the atmosphere which is sufficiently constricted for producing a capillary action, characterized in that the constricted opening is formed by at least one small bore.

9. A battery according to claim 8, characterized in that the constricted opening is formed by several small bores.

10. A battery according to claim 9, characterized in that each small bore has a diameter of about 2 mm.

11. A battery according to claim 10, characterized by at least one series-connected throttle cross section means connected upstream of said opening of the fill-in connection means terminating in the cell means.

12. A battery according to claim 11, characterized by at least one flow deflection means in said fill-in connection means.

13. A battery according to claim 3, wherein the battery has an outer wall, and the diaphragm means is made of a material softer than the material of which the outer wall is constructed.

14. A battery according to claim 1, characterized by a diaphragm means provided with the control opening means which is held in an opening terminating in the cell means.

15. A battery according to claim 14, characterized in that the diaphragm means is pot-shaped and positioned facing the cell means, and the control opening means is arranged in the bottom of the pot-shaped diaphragm means facing the cell means.

16. A battery according to claim 1, including a fill-in chamber in communication with said cell means by way of said fill-in connection means and said control opening means.

17. A battery according to claim 16, characterized by a diaphragm means provided with the control opening means which is held in an opening terminating in the cell means.

18. A battery according to claim 17, wherein the diaphragm means is pot-shaped and is recessed with respect to the fill-in chamber, whereby the control opening means cannot snap back beyond the normal closing position upon removal of the testing device and whereby splashing up of liquid due to the snap-back is substantially prevented.

19. A battery comprising at least one cell means containing an electrolyte liquid in which the cell means is connected with the atmosphere by way of a fill-in vent connection determining its liquid level and by way of a separate fill-in connection means for filling-in electrolyte liquid and refilling distilled water, and in which the free flow cross section of the fill-in connection means is dimensioned so narrowly that a liquid seal closing off the fill-in connection means gas-tight will form under the influence of the capillary action and of the excess pressure which will be established during the fill-in operation in the cell means when the liquid has entered the opening of the fill-in vent connection terminating in the cell means, characterized in that at least one baffle means for dissipating kinetic energy of the liquid to be filled-in is connected in series with and upstream of the opening of the fill-in connection means terminating in the cell means in the direction toward the atmosphere and in that the battery further includes a fill-in chamber in communication with said cell means by way of said fill-in connection means and a diaphragm means for forming the bottom of the fill-in chamber, and wherein said baffle means includes an annular flange having said diaphragm means seated thereon.

20. A battery with at least one cell means containing an electrolyte liquid, which includes a fill-in vent connection means determining its liquid level whose opening terminating in the atmosphere is constricted sufficiently for producing a capillary action, characterized in that the constricted opening is formed by at least one small bore.

21. A battery according to claim 20, characterized in that the constricted opening is formed by several small bores.

22. A battery according to claim 20, characterized in that the small bore has a diameter of about 2 mm.

23. A battery comprising at least one cell means containing an electrolyte liquid, in which the cell means is connected with the atmosphere by way of a fill-in vent connection determining its liquid level and by way of a separate fill-in connection means for filling-in electrolyte liquid and refilling distilled water, the fill-in vent connection and fill-in connection means being adjacent each other, and the opening of said fill-in vent connection terminating in the atmosphere being constricted for producing a capillary action and being formed in the shape of a bore, whereby unintended entry of liquid into said opening of said fill-in vent connection is substantially prevented.

24. A battery comprising at least one cell means containing an electrolyte liquid, in which the cell means is connected with the atmosphere by way of a fill-in connection means for filling in electrolyte liquid and for refilling distilled water and by way of a control opening means for the insertion of a testing device for checking the operating condition, said control opening means is operable to be enlarged, said control opening means being separate from the fill-in connection means and being essentially closed when the testing device is not inserted therein.

25. A battery according to claim 24, wherein the free flow cross section of the fill-in connection means is dimensioned so narrowly that a liquid seal closing off the fill-in connection means gas-tight will form under the influence both of the capillary action and of the excess pressure which will be established during the filling operation of the cell means.

* * * * *